United States Patent Office 3,213,342
Patented Oct. 19, 1965

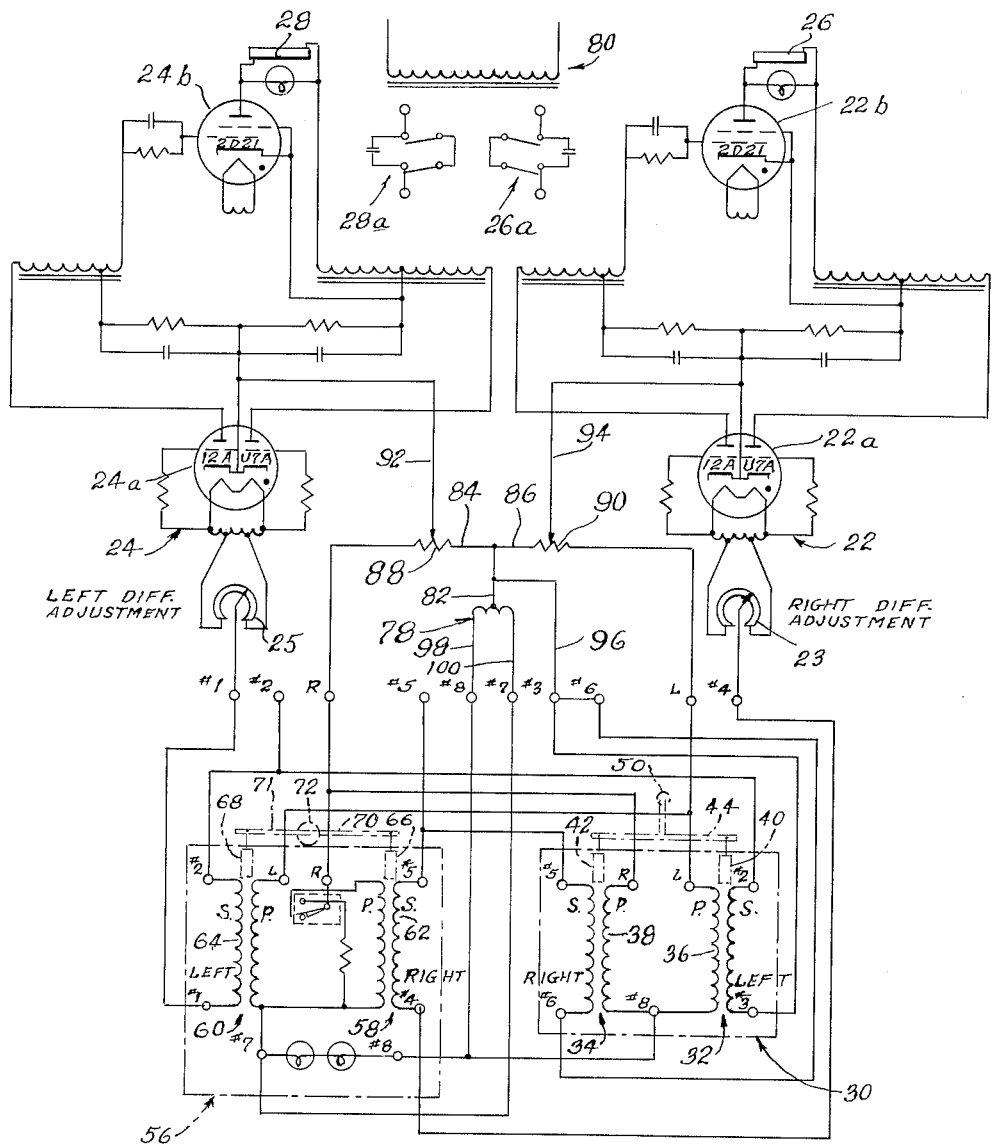

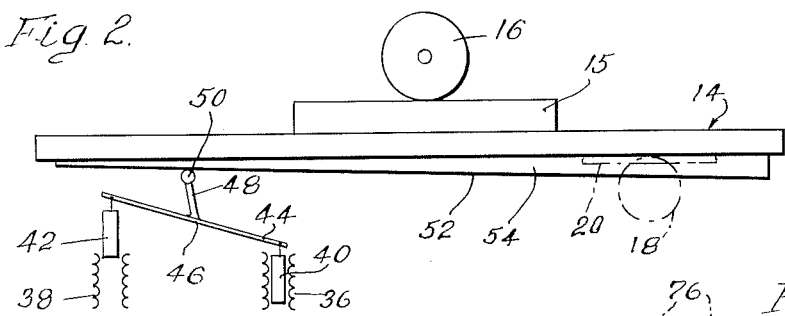
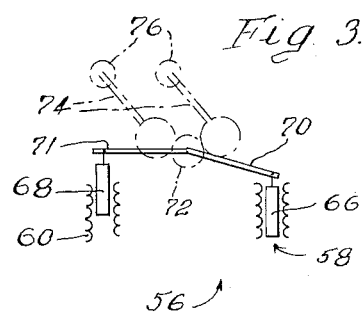
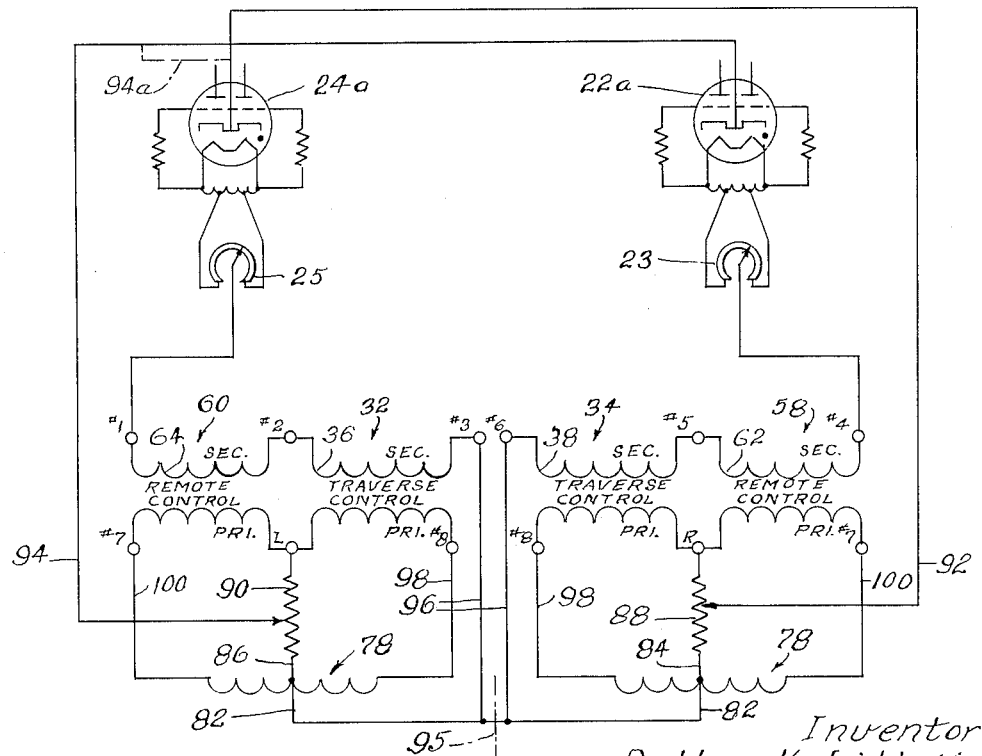

3,213,342
AUTOMATIC MOTOR REVERSAL CONTROLLED BY VARIABLE TRANSFORMER MEANS
Arthur K. Littwin, Lincolnwood, Ill., assignor, by mesne assignments, to Robert L. Littwin, Arthur K. Littwin, Horace A. Young, and Donald F. Littwin, trustees
Filed May 23, 1962, Ser. No. 197,053
12 Claims. (Cl. 318—286)

The present invention relates to electrical control means.

Reference is made to my application, Serial No. 417,338, filed December 10, 1964, covering the subject matter of FIGURE 5 originally included in the application that resulted in this patent.

The control means of the present invention is particularly adapted to incorporation in or use with the control means disclosed and claimed in my co-pending application, Serial No. 637,140, filed January 30, 1957, now Patent No. 3,045,165, issued July 17, 1962. The control means disclosed in that application is especially useful in connection with machine tools in which the movements of a part are to be controlled, as for example, the reciprocating movements of a table in a grinding machine, milling machine, etc. The control means incorporating the present invention utilizes a transformer means, including a coil and armature movable relative thereto for setting up inductance for controlling relay means which in turn control the movements of the moving parts, such for example, as reversing it, and this may be done through an electrical motor, hydraulic means, pneumatic means, etc. The utilization of variations in inductance, as referred to, is particularly advantageous, in that extremely great flexibility of operation is made possible. Coils as referred to vary in characteristics, e.g., according to the heated condition thereof, and the point of function control thereof, such as point in time or point in location, may vary according to the heated condition thereof or other change in characteristics.

A broad object of the present invention is to provide means to automatically compensate for any variations in effectiveness of control transformers or coils due to local or temporary changes in normal operating characteristics thereof.

A more specific object is to provide novel compensating means, for use in connection with control means having a plurality of coils for effecting control functions, in which armatures are relatively moved into and out of corresponding coils, and the cumulative effect thereof is utilized in a control function, for compensating for variations in operating characteristics of the coils.

Other objects and advantages of the invention will appear from the following detailed description taken in conjunction with the accompanying drawings, in which:

FIG. 1 is a diagram of an electrical circuit utilized in the control means of the present invention;

FIG. 2 is a fragmentary and partially diagrammatic illustration of certain control elements utilized in the apparatus;

FIG. 3 is a fragmentary and partially diagrammatic illustration of other control elements;

FIG. 4 is a diagram of a portion of the circuit of FIG. 1, but showing certain elements rearranged therein for purposes of facilitating showing of the relation therebetween.

Referring in detail to the drawings, attention is directed first to FIG. 1, showing a principal portion of the electrical circuit utilized in the invention, made up of two basically identical or symmetrical counterparts. These counterparts are related to corresponding phases in the reciprocating operation of a table, such as indicated at 14 in FIG. 2 and as illustrated at 12 in my co-pending application referred to. In the specific adaptation of the invention disclosed, the table 14 is incorporated in a machine tool in which a workpiece 15 is placed thereon for grinding by a grinding wheel 16, the table being reciprocated for moving the workpiece back and forth under the grinding wheel. The table 14 may be reciprocated by any suitable means, such as, and as here represented, a pinion 18 engageable with a rack 20 on the table, the pinion being driven by, for example, an electric motor, hydraulic motor, pneumatic motor, etc., the principal consideration being that the control operation performed on the means for moving the table is controlled under the control elements included in the circuit of FIG. 1. Referring to that circuit, there are two sets of tube means 22 and 24, each including two tubes 22a and 22b, and 24a and 24b respectively. Associated with the tube means are differential adjustment means 23 and 25 respectively. The tube 22a functions as an amplifier tube for controlling the tube 22b, and when the latter is rendered firing, it controls a relay represented by a coil 26 and similarly on the opposite side, the tube 24a acts as an amplifier tube controlling the tube 24b and when the latter fires or otherwise becomes operative, actuates a relay represented by the coil 28. These coils 26 and 28 may control respective switches 26a and 28a, or other suitable switch means, such as indicated at 62 and 64 in the co-pending application referred to above, which in turn may control the motor-driven pinion 18. As the reciprocating table 14 reaches opposite ends of its range of movement, according to the setting of the apparatus, as described hereinbelow, the respective tube triggers the relay for performing the reversing operation.

This triggering or reversing operation is performed through the instrumentality of a traverse control indicated in its entirety at 30, which includes a pair of transformers 32 and 34, having coils 36 and 38 respectively, with which are associated armatures 40 and 42 respectively. These armatures are pivotally mounted on opposite ends of a beam 44 mounted on a fixed element of the apparatus at an intermediate pivot point 46. This assembly, i.e., the traverse control 30, is mounted adjacent the reciprocating table 14 (FIG. 2) in such a way that the beam 44 is actuated by the table in the movements thereof. For this purpose, the beam 44 has a fixed arm 48 having a roller 50 on the end thereof serving as a cam follower which rides on an inclined camming surface or sensing surface 52 on a cam or "taper bar" 54 mounted on the table 14. The beam 44 is biased in an appropriate direction for retaining the cam follower 50 in engagement with the inclined surface, and as the table moves, the beam 44 is rocked and moves the armatures 40 and 42 relative to the respective coils. As the table moves to the left (FIG. 2), for example, the armature 40 is withdrawn from the corresponding coil, while the armature 42 is moved into its coil. In the movement of the table in the opposite direction, the beam, of course, is moved in the direction opposite to that described.

Associated with the traverse control 30 is a remote control indicated in its entirety at 56, and in general nature similar in construction to the traverse control 30. The remote control 56 includes transformers 58 and 60, having coils 62 and 64 respectively, and associated with the coils are armatures 56 and 58 respectively. These armatures are pivotally mounted on opposite ends of individual arms 70 and 71 mounted in a suitable location on the apparatus on a common pivot point 72, the arms being manually swung by shaft means 74 and knobs 76. Upon rotation of the knobs 76 in one or the other direction, the respective armatures 66 and 68 are moved into or out of the corresponding coils 62 and 64.

The foregoing components of the control apparatus are included in my patent referred to above, and further details of the controls may be obtained from that application. Suffice to say here that as the armatures 40 and 42 are moved into or out of the corresponding coils 36 and 38, the corresponding tube means 22 or 24 are controlled and triggered for performing the control operation, which in this instance is a switching and reversing operation. It is to be understood that the operation may be starting, stopping, etc., within the broad aspects of the invention, and need to be a reversing operation as such.

The remote control 56 is utilized for controlling the points at which the reversing operation is accomplished relative to the movements of the table, and specifically, as the armature 66 or 68 is moved into the respective coil, the inductance caused thereby is imposed on the corresponding tube means, modifying the effect of the transformers 32 and 34, all as described in detail in the copending application referred to above.

The various elements relating to the right and left phases of the control and the corresponding movements thereof are so designated right and left for ease in analyzing the circuit, and the primary and secondaries of the coils are also so indicated.

Due to the relative presence or absence of iron in the circuit, resulting from the movements of the armatures into and out of the coils, the inductance established in the coils is varied, and the reactance and corresponding current through the coils is thereby affected, the current directly affecting the point at which the tube means are triggered. In order to overcome any variation in the points at which the tube means are triggered relative to the movement of the table, I have utilized the combined effect of the traverse control coils and the remote control coils in such a way as to automatically balance or cancel any variation that otherwise might occur due to variation in inductance in the coils, and heating thereof consequent on increased current. More specifically, the coils are arranged in a certain series relation, namely, the traverse control transformer 32 is placed in series with the remote control transformer 58, with the two primaries in series and the two secondaries in series. A similar arrangement is utilized in the other counterpart of the circuit, namely, the left traverse control transformer 32 is put in series with the left remote control transformer 60 with the primaries in series and the secondaries in series. Attention is directed to FIG. 4 for a layout of these elements in more readily observable fashion, the circuit of FIG. 4 being essentially the lower portion of the circuit of FIG. 1 which includes the lower tubes 22a and 24a and the portions therebelow. As the table moves in one direction, e.g., to the left in FIG. 2, as noted above, and the armature 40 is withdrawn from the corresponding coil 36 while the opposite armature 42 is moved in direction into the corresponding coil 38, the relative conditions of these two coils change, and they change relative to the condition of the remote control coils 62 and 64. The series arrangement of the traverse and remote control coils referred to and as illustrated in FIG. 4, compensates automatically for any change in the respective coils. For example, referring to the right half of FIG. 4 as the armature is moving into the coil 38 of the traverse transformer 34, the potential built up in the secondary is imposed on the right tube 22a through the right differential adjustment 23, while the counterpart potential condition is exerted on the cathode of the opposite tube 24a. A similar condition exsists in connection with the opposite side of the circuit.

In order to achieve this balanced condition, a secondary coil 78 is provided, being conveniently of 12 volts, this coil deriving its potential from the primary 80 of the main source of supply. The secondary coil 78 is center tapped by a conductor 82 which connects through diverging conductors 84 and 86 with potentiometers 88 and 90 respectively. Leading from these potentiometers are sliding contact conductors 92 and 94 respectively leading to the cathodes of the tubes 24a and 22a. Leading also from the center tap 82 is a conductor 96 leading to the secondaries of the traverse transformers 32 and 34.

The terminals of the coil 78 through conductors 98 and 100 are connected with the opposite ends of the two primaries in each group that are connected together in series. In FIG. 4, the single coil 78 appears twice, for convenience.

The right and left differential adjustment means 23 and 25 may be utilized for setting up the apparatus according to certain desired limits with relation to the voltage encountered in the particular installation. The traverse control transformers 32 and 34 actuate the tube means at the respective ends of travel of the table, and the remote control transformers 58 and 60 are manually set for determining the points at which the transformers 32 and 34 become effective relative to the positions of the table. The voltage on each set of transformers that are connected in series, such as the transformers 34 and 58 (FIG. 4) at one side and the other transformers 32 and 60 on the other side, provide automatic compensation by producing a balanced condition, as for example, when the current in a remote control transformer is reduced, the reactance is increased while it is reduced in the other transformer 34 in series therewith, resulting in a final current through the series coils which is not affected by any change in condition in any of the individual coils, such as by heat or variations in inductance.

The principle of the invention also is operative in conjunction with the use of resistances instead of inductance coils, changes and adjustments being made in the resistances corresponding to those in the coils as described herein.

For convenience in identifying connections in the circuits, numbered binding posts are utilized.

The foregoing dual arrangement provides compensation for variations in inductance and heat. The apparatus is also applicable for use in controlling, for example, unidirectional movement, utilizing only one stage. A single traverse control transformer (e.g. 32) could be used, controlled by a single remote control transformer (60), where a reversing operation is not required. In such coil the present circuit could essentially be cut in half, by connecting the conductor 94 to the cathode of the tube 24a as indicated by the dot-dash line 94a, and the right hand half of the circuit eliminated, i.e., that portion to the right of the dot-dash line 95. In the latter case, compensation for variation due to heat change would be provided for.

An advantage of the invention is, for example, that when a machine is started up cold and gradually heats up, the points at which the transformers become effective for actuating the tube means vary and in machines heretofore known manual adjustments or compensations must be made throughout this period and until the machine reaches its ultimate heated condition. However, with the present invention, the operator is assured that the operation of the machine will be accurate and constant, regardless of whether the transformer tubes are cold or heated.

Another great advantage is found in connection with starting and stopping a machine throughout any given job. It is desirable that each job be continued until its completion, without interruption, because of the variation in accuracy of operation as heretofore encountered when transformers are cold and relatively heated. For example, if an operator were operating on a large job that could not be completed during a normal work period, such as a day, and the machine had to be shut down overnight, the operator could not be assured the next morning that the machine would perform in accordance with the settings made the day before when the transformers were heated. It would then be necessary to either wait for the transformers to become heated on the next day before setting the machine into operation, or to make constant or periodic adjustments therein. However, in the use of the present invention, the operator will be assured that the machine will operate accurately according to the settings previously made in the machine, even when the transformers are cold, as when the machine is started up first in the morning, as it did while the transformers were heated.

While I have shown herein certain preferred forms of the invention, it will be understood that changes may be made therein within the scope of the appended claims.

I claim:

1. In apparatus of the character disclosed, a reciprocable table, drive means for driving the table, means for controlling the drive means including switch means operably controllable by the table at a pre-determined point at each end of the range of movement of the table as hereinafter set forth, tube means for controlling each switch means, a first transformer electrically connected with each tube means including an armature movable by the table for varying the bias on the respective tube means and rendering it conducting, and a manually adjustable transformer electrically connected with each first transformer for independently varying the point at which the respective tube means becomes conducting relative to the position of the table, and thereby varying the point at which the respective tube means becomes conducting relative to the position of the table, and thereby varying the effective positioning of the respective tube means and switch means relative to the range of movement of the table, the primaries of the two transformers connected with each tube means being connected in series and interconnected with the cathode of the opposite tube means.

2. The invention set out in claim 1 wherein the manually adjustable transformers are in close proximity and the movement of the armature in either of those transformers produces inductance in the other.

3. The invention set out in claim 2 wherein a third transformer is provided and arranged in a bridge with the primaries of each first and manually adjustable transformer, said bridge including an adjustable resistor, and a conductor leads from each adjustable resistor to the opposed tube means.

4. The invention set out in claim 3 wherein the primaries of the associated first and manually adjustable transformers are of equal value, and the third transformer is center tapped to form the bridge 5. The invention set out in claim 4 in which the terminals of the secondaries in series are connected respectively with the anode in one tube means and the cathode in the other tube means.

6. The invention set out in claim 5 in which a coil is connected with the terminals of the primaries in series and the connection with the respective tube means is connected with the cathode of that tube means.

7. The invention set out in claim 6 in which the connection between the coil and the cathode is at the midpoint of the coil.

8. The invention set out in claim 7 in which an adjustable resistor is interposed between the coil and the cathode.

9. In apparatus of the character disclosed, a reciprocable table, drive means for driving the table, means for controlling the drive means including switch means operably controllable by the table at a pre-determined point at each end of the range of movement of the table as hereinafter set forth, tube means for controlling each switch means, induction means electrically connected with each tube means and operable for rendering the tube means conducting, means operated by movement of the table for controlling the induction means at respective ends of movement of the table, second induction means electrically connected with each first induction means, and manually adjustable means for varying the second induction means for thereby controlling the first induction means, and manually adjustable means for varying the second induction means for thereby controlling the first induction means and modifying the same relative to the control exerted thereon by the table, and third transformer means forming a bridge with the first induction means and second induction means of each set, and circuit means interconnecting each bridge with the cathode of the opposing tube means for varying the bias thereon.

10. In the invention set out in claim 9 wherein the second induction means can be individually manually adjusted for variation singly or in unison.

11. In the invention set out in claim 10 wherein the first induction means are uniformly oppositely controlled by the table.

12. In the invention set out in claim 11 wherein the induction means include transformers, there being two transformers associated with each tube means, the secondaries of the two transformers being in series and the primaries of the two transformers being in series, a third transformer forming a bridge with the two primaries, a variable resistor inter-connecting at mid point between the primaries of the first and second transformers and a center tap on the third transformer, a conductor slidably connecting the adjustable resistor and the cathode of the opposing tube means, the secondaries of the first and second transformers being connected with the filament of the tube means associated therewith, armatures alternately movable into and out of the two first transformers in response to reciprocating movements of the table, and armatures selectively movable into and out of said manually adjustable transformers selectively singly or in unison.

References Cited by the Examiner

UNITED STATES PATENTS

| 1,909,471 | 5/33 | Kelly | 317—142 |
| 2,859,396 | 11/58 | King | 318—282 |
| 2,913,651 | 11/59 | Smith et al. | 318—282 |
| 2,950,422 | 8/60 | Purkhiser | 317—142 |
| 3,045,165 | 7/62 | Littwin | 318—286 |

ORIS L. RADER, *Primary Examiner.*